Patented May 7, 1935

2,000,717

UNITED STATES PATENT OFFICE 2,000,717

PROCESS FOR BREAKING PETROLEUM EMULSIONS

Claudius H. M. Roberts, Long Beach, Calif., assignor to Tretolite Company, Webster Groves, Mo., a corporation of Missouri No Drawing. Application April 13, 1933,
Serial No. 665,962

20 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occuring waters or brines, dispersed in a more or less permanent state throughout the oil which constitutes the continuous phase of the emulsion. They are obtained from producing wells and from the bottom of oil storage tanks, and are commonly referring to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedure.

The treating agent used in my process consists of a substituted polyhydric alcohol of the kind obtained when a polyhydric alcohol or derivative thereof is partially or completely esterfied by the replacement of one or more of the alcoholiform hydroxyls by one or more polybasic carboxy acid residues or derivatives thereof. Such substituted alcohol may be produced by any suitable reaction, and is characterized by the composition of the product itself. Where the polyhydric alcohol is united directly to an acidic hydrocarbon derivative, such as stearic acid, it is considered as a polyhydric alcohol derivative, even though the acidic hydrocarbon derivative may have been combined therewith subsequent to the reaction of the polyhydric alcohol with the polybasic acid. Similarly, where the polybasic acid is united directly to a basic hydrocarbon derivative, such as cetyl alcohol, it is considered as a polyhydric alcohol derivative, even though the basic hydrocarbon derivative may have been combined therewith subsequent to reaction of the polybasic acid with the polyhydric alcohol. In still other cases, where the hydrocarbon derivative contains both acidic and basic groups, as in hydroxystearic acid, this may be suitably linked both to the polyhydric alcohol and to the polybasic acid, either before or after reaction between said polyhydric alcohol and polybasic acid.

One may denote a polyhydric alcohol by the formula $R(OH)_n$, in which $n$ represents the numeral two or more; a polybasic carboxy acid may be denoted by the formula $A(COOH)_n$, in which $n$ represents the numeral two or more. The reaction products may be of the type $(R'A')_m$, in which a polyhydric alcohol is combined completely with a polybasic carboxy acid of the same valence, and $m$ is one or more. $R'A'(COOH)_m$ may be employed to indicate the reaction product, in which a polyhydric alcohol combines with a polybasic acid having greater valence, such as a dihydric alcohol with a tricarboxy acid, and $m$ represents the numeral one or more. Likewise, the formula $R'A'(OH)_m$ represents a compound of the type where a polyhydric alcohol is reacted with a polybasic acid of lesser valence, as a reaction between glycerol and phthalic acid. The formula $$R'A'(OH)_m(COOH)_m$$

indicates a product obtained by reaction between a polyhydric alcohol and a polycarboxy acid of the same valence, in which only partial neutralization takes place. The letter $m$ has the same significance as before. Obviously, incomplete neutralization may take place in reactions involving polyhydric alcohols and carboxy acids of dissimilar valence. Likewise, reactions may continue between compounds of the type $R'A'(COOH)_m$ and $R'A'(OH)_m$. Either one of these compounds just mentioned may react with an amphoteric type compound $$R'A'(OH)_m(COOH)_m.$$

Likewise, the acidic group indicated in the formula by $(COOH)_m$ may combine with any reactive material, such as another molecule of the polyhydric alcohol indicated by the formula $R(OH)_m$ or a monohydric alcohol, such as ethyl alcohol, isopropyl alcohol, cetyl alcohol, benzoyl alcohol, trimethyl carbonal, cyclohexanol, methyl-cyclo-pentanol, furfur-alcohol, etc. Likewise, the basic hydroxl in the formulas may combine with additional molecules of the polybasic carboxy acid $A(COOH)_m$, or it may combine with a monobasic acid, such as acetic acid, butyric acid, oleic acid, stearic acid, benzoic acid, cinnamic acid, picolinic acid, cyclohexane carboxylic acid, etc.

It is obvious, where reactions take place between polyhydric alcohols and polybasic carboxy acids, that if one obtains a compound of the type previously designated $R'A'(OH)_m(COOH)_m$, that said material can combine with itself to produce long chain or cyclic compounds characterized by the fact that although the compound contains the groups $(OH)_m$ and $(COOH)_m$, yet $R'A'$ must be indicated as $(R'A')_n$, in which $n$ has the prior significance of two or more, and the polymerized product thus obtained is indicated by the formula $(OH)_m(R'A')_n(COOH)_m$. If such reaction is permitted to continue indefinitely, that is until $n$ becomes a relatively large number, one obtains a substance of very large molecular weight, having the properties of a resin, that is, insoluble in oil and water, even after neutralization of the residual carboxyl or hydroxyl, and furthermore, the materials are substantially solids in nature. In the instances where $n$ is a relatively small number, for instance, less than 10, the product thus obtained has characteristics intermediate between the simplest neutral product obtained by complete reaction involving a dihydric alcohol plus a dibasic carboxy acid, and a substantially solid, insoluble type, resinic product. I shall refer to these materials intermediate between the simplest products and resinic products as resin intermediates, and designate them by the formula

$(OH)_m(R'A')_n(COOH)_m$, where $m$ indicates the numeral one or more and the $n$ indicates the numeral two or more.

It is understood from the description of the reactions above described that one is not limited to the use of the polyhydric alcohols and the polybasic carboxy acids, but that one may also employ simple derivatives, which do not change the basic or acidic properties. For instance, a halogen derivative of glycol or glycerol, such as chloroglycerol, would be as effective as the unaltered polyhydric alcohol. Likewise, chlorophthalic acid, or a similar modification of citric acid, etc., would be as suitable as the unaltered polybasic carboxy acid. The anhydrides are just as suitable for use as the acids themselves.

In the reaction products above described the hydrogen of the carboxyl is indicated in the conventional manner as H, representing an acidic hydrogen atom. Obviously, the acidic hydrogen can be replaced by any equivalent. Such acidic material may be treated with a suitable alkaline material, such as caustic soda, caustic potash, ammonium hydroxide, calcium hydroxide, magnesium hydroxide, etc., so as to produce the corresponding metallic salts, many of which are water-soluble. Basic amines, such as triethanolamine, may be employed for neutralization. The acidic hydrogen may be combined with an alcohol of any kind, as previously stated, to produce an ester. The acidic hydrogen may remain unneutralized. The hydroxyl of the carboxyl may be combined with an amine by eliminating a hydrogen of the amine with the separation of a molecule of water. Water-soluble salts of the kind previously referred to may be reacted with metallic water-soluble salts, such as copper salts, iron salts, aluminum salts, zinc salts, magnesium salts, etc. to produce salts of the respective metals by metathesis.

I have found, however, that the most desirable compounds are obtained by uniting a material of the kind previously indicated, for instance, a basic type, such as $R'A'(OH)_m$ with a long chain acidic body, particularly a carboxy long chain compound, such as oleic acid, stearic acid, linolic acid, etc. Instead of a fatty carboxy acid one may employ a petroleum carboxy acid, such as naphthenic acid, or a rosin carboxy acid, such as abietic. Likewise, the material thus employed need not be of the carboxy type, but may owe its acidity to the presence of a sulfo group, a nitro group, or a phosphoric acid group or radical, etc. Thus, one could employ oleic acid hydrogen hydrogen sulfate, or the fatty acid sulfate obtained from the equivalent glyceride which is free from carboxylic hydrogen. Likewise, one may employ fatty sulfonic acids or petroleum sulfonic acids. Said petroleum sulfonic acids may be of the water-soluble type or of the oil-soluble type.

As a matter of fact, equally valuable products may be obtained by reaction between an acid material of the type mentioned, such as $R'A'(COOH)_m$ and a long chain material of basic characteristics, such as hydroxystearic acid, ricinoleic acid, cetyl alcohol, etc. The reactions indicated, forming either the acidic or the basic type product, are also suitable for the production of compounds forming the amphoteric type, which I have indicated as $R'A'(OH)_m(COOH)_m$ and also

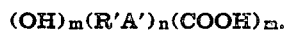
$(OH)_m(R'A')_n(COOH)_m$.

In making reagents of these types involving such long chain compounds as hydroxystearic acid, it is understood that the acidic hydrogen, such as the hydrogen of the carboxyl, or the hydrogen of a sulfonic group, may be replaced by various acid hydrogen equivalents previously indicated, so as to produce acids, salts, esters, amine salts, amine derivatives, etc. It is also obvious that various of my reagents may be oil-soluble, whereas, others may be water-soluble. Some may exhibit both oil and water solubility.

Certain of the reagents which are not soluble in water are referred to as "water immiscible". This term "water immiscible" as herein used is intended to mean that the material will not produce a water solution or a water sol, but will separate from water as a separate layer and particularly as a distinct fluid at a temperature below its melting point.

The commonest reaction of inorganic chemistry is the reaction involving an acid and a base resulting in the formation of a salt and water, and generally referred to as neutralization. When the base is organic in nature, that is, an alcohol, the reaction product is known as an ester, and the process, instead of being referred to as neutralization, is referred to as esterification. Esterification is in essence the reverse of hydrolysis. Thus, the products obtained for use in my process for treating emulsified oil are obtained by the partial or complete esterification of a polyhydric alcohol, or by equivalent reaction with other suitable reagents. Such products are generally referred to as products of esterification. They are not substitution products in the conventional sense employed in organic chemistry. Substitution, as generally employed in organic chemistry, means the replacement of one or more of the atoms of an organic radical, usually a hydrocarbon radical, by a substituent atom or radical. It is to be noted that the reagents employed in my process are obtained from polyhydric alcohols by replacing the alcoholiform hydroxyl radical, and not by replacing a hydrogen of the organic radical. Likewise, the replacement of the acid hydrogen atom of an organic carboxy acid is not substitution. If the hydrogen of an organic radical is replaced, as in the case of chloroglycerol, such a material may be used, but it does not constitute a treating agent of the kind contemplated until the alcoholiform hydroxyl group is replaced. Having pointed out that I am using the word "substituted" in a peculiar sense, and not in its general meaning, I will refer to the reagents employed in my process, for the sake of simplicity, as substituted polyhydric alcohols. Various polyhydric alcohols may be employed. They may be aliphatic, aromatic, cyclic, aralkyl, heterocyclic, etc. Suitable polyhydric alcohols include ethylene glycol, glycerol, erythritol, adonitol, mannitol, dihydroxy-naphthalene, alizarin, purpurin, terpin, dihydroxy-thiophene, etc.

Likewise, one may employ various polybasic carboxy acids, including those of the aromatic type, alkyl type, aralkyl type, cyclic type, heterocyclic type, etc. Suitable examples including those previously pointed out are succinic, maleic, malic, aconitic, tartaric, citric, fumaric, tricarballylic, trihydroxy-glutaric, mesoxalic, phthalic, diphenic, naphthalic, benzoyl-benzoic, trimesic, mellitic, cinchomeronic, quinolinic, camphoric, aspartic, norpinic, glutamic, etc. In addition, the polyhydroxy phenols, which are amphoteric in nature, such as catechol, resorcinol, quinol, pyrogallol, hexahydro-phenol, etc., may be employed as and are equivalent to polybasic, carboxy acids when caused to react with more basic substances or are equivalent to polyhydric alcohols when caused to react with more acidic substances than themselves.

One may employ the acids or alcohols themselves or their derivatives, such as halogen derivatives, etc., provided that the materials still exhibit the desired acidic or basic character. Likewise, in employing the various monobasic alcohols, or monobasic acids, one may employ the materials themselves or their derivatives, such as chloroleic acid, etc., provided that these derivatives still exhibit the desired acidic or basic character. For the sake of unity, and simplicity, I prefer to designate polyhydric alcohols and their derivatives and polybasic acids and their derivatives, of the kinds described, as polyhydric alcohol bodies and polybasic acid bodies, respectively. Similarly, for the sake of unity and simplicity, I prefer to designate the acidic hydrocarbon derivatives, the basic hydrocarbon derivatives, the hydrocarbon derivatives containing both acidic and basic groups, the monohydric alcohols, the monobasic acids, long chain acidic bodies, long chain basic materials and their derivatives, which have been previously referred to, of which examples have been given and whose modes of reaction with the polyhydric alcohols and with the polybasic acids have been described, as reactive hydrocarbon derivatives. Similarly, I prefer to designate these reactive hydrocarbon derivatives, subsequent to their reaction, with the polyhydric alcohols, or the polybasic acids, as hydrocarbon derivative residues.

My preferred reagent is produced by reacting phthalic acid or anhydride with glycerol, so as to produce a phthalic acid glycerol compound of the type $R'A'(OH)_m(COOH)_m$, in which $R'$ represents the glycerol residue, $A'$ represents the phthalic acid residue, m represents the numeral two at its first appearance, and the numeral one at its second appearance. Said material is heated for approximately ten minutes, at approximately 150° C., so that polymerization takes place, and one obtains the corresponding material $(OH)_m(R'A')_n(COOH)_m$. This material is then mixed with an equal weight of castor oil and heated so as to produce a reaction between the alcoholiform hydroxyl of the triricinolein and the hydrogen of the carboxyl group of the resin intermediate. Such reaction has generally proceeded sufficiently far after approximately 20 minutes at approximately 250° C. The product may be employed as is, or if desired, it may be partially neutralized with ammonium hydroxide or caustic soda to eliminate any unreacted carboxylic hydrogen, and may or may not be mixed with one or more suitable solvents, such as benzol, solvent naphtha, denatured alcohol, pineoil, etc.

Without reference to the reactions involved, which have been explained very completely, one may simply follow the following directions for producing a suitable reagent for use in my process: Mix 296 lbs. of phthalic anhydride with 92 lbs. of glycerol, and heat for approximately five to ten minutes at approximately 125° C. to 150° C., until a thin, clear, water-white liquid resin intermediate, containing no unreacted phthalic anhydride, has been produced. With the resin intermediate is then mixed 312 lbs. of castor oil and the mixture is heated to from 150° to 250° C., for approximately ten to thirty minutes, after which it is permitted to cool and is diluted with from ten to fifty percent of benzol. The compound is then ready for use or may first be saponified to water-solubility, using concentrated ammonium hydroxide.

The materials previously described need not be employed alone, as a demulsifying agent, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pineoil, ethyl alcohol, butyl alcohol, propyl alcohol, etc.

In practicing my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described my invention, what I claim and desire to secure by Letters Patent is:

1. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a polybasic carboxy acid body residue, and said polybasic carboxy acid body residue is characterized by the fact that at least one of its remaining acid hydrogens has been replaced by a hydrocarbon derivative residue, derived from a hydrogen body free from an acid hydrogen.

2. A process for breaking a petroleum emulsion of the water-in-oil type, which consists in subjecting the emulsion to the action of a demulsifying agent comprising a substituted polyhydric alcohol, in which at least one alcoholiform hydroxyl has been replaced by a polybasic carboxy acid residue, and said polybasic carboxy acid residue is characterized by the fact that at least one of its remaining acid hydrogens has been replaced by a hydrocarbon derivative residue, derived from a hydrogen body free from an acid hydrogen.

3. A process for breaking a petroleum emulsion of the water-in-oil type, which consists in subjecting the emulsion to the action of a demulsifying agent comprising a substituted polyhydric aliphatic alcohol, in which at least one alcoholiform hydroxyl has been replaced by a polybasic carboxy acid residue, and said polybasic carboxy acid residue is characterized by the fact that at least one of its remaining acid hydrogens has been replaced by a hydrocarbon derivative residue, derived from a hydrogen body free from an acid hydrogen.

4. A process for breaking a petroleum emulsion of the water-in-oil type, which consists in subjecting the emulsion to the action of a demulsifying agent comprising a substituted polyhydric alcohol, in which at least one alcoholiform hydroxyl has been replaced by a polybasic aromatic carboxy acid residue, and said polybasic aromatic carboxy acid residue is characterized by the fact that at least one of its remaining acid hydrogens has been replaced by a hydrocarbon derivative residue, derived from a hydrogen body free from an acid hydrogen.

5. A process for breaking a petroleum emulsion of the water-in-oil type, which consists in subjecting the emulsion to the action of a demulsifying agent comprising a water-immiscible substituted polyhydric alcohol body, in which at least one alcoholiform hydroxyl has been replaced by a polybasic carboxy acid body residue.

6. A process for breaking a petroleum emulsion of the water-in-oil type, which consists in subjecting the emulsion to the action of a demulsifying agent comprising a water-immiscible substituted polyhydric alcohol body, in which at least one alcoholiform hydroxyl has been replaced by a polybasic carboxy acid body residue, said demulsifying agent being further characterized by the presence of a chemically combined hydrocarbon derivative residue obtained from a source other than the polyhydric alcohol or polybasic acid.

7. A process for breaking a petroleum emulsion of the water-in-oil type, which consists in subjecting the emulsion to the action of a demulsifying agent comprising a water-immiscible substituted polyhydric alcohol body, in which at least one alcoholiform hydroxyl has been replaced by a polybasic carboxy acid residue and in which at least one alcoholiform hydroxyl has been replaced by a hydrocarbon derivative residue.

8. A process for breaking a petroleum emulsion of the water-in-oil type, which consists in subjecting the emulsion to the action of a demulsifying agent comprising a water-immiscible substituted polyhydric alcohol body, in which at least one alcoholiform hydroxyl has been replaced by a polybasic carboxy acid body residue, and said polybasic carboxy acid body residue is characterized by the fact that at least one of its remaining acid hydrogens has been replaced by a hydrocarbon derivative residue.

9. A process for breaking a petroleum emulsion of the water-in-oil type, which consists in subjecting the emulsion to the action of a demulsifying agent comprising a water-immiscible substituted polyhydric alcohol body, free from sulfonic acid radicals, in which at least one alcoholiform hydroxyl has been replaced by a polybasic carboxy acid body residue.

10. A process for breaking a petroleum emulsion of the water-in-oil type, which consists in subjecting the emulsion to the action of a demulsifying agent comprising a water-immiscible substituted polyhydric alcohol body, free from sulfonic acid radicals, in which at least one alcoholiform hydroxyl has been replaced by a polybasic carboxy acid body residue, said demulsifying agent being further characterized by the presence of a chemically combined hydrocarbon derivative residue obtained from a source other than the polyhydric alcohol or polybasic acid.

11. A process for breaking a petroleum emulsion of the water-in-oil type, which consists in subjecting the emulsion to the action of a demulsifying agent comprising a water-immiscible substituted polyhydric alcohol body, free from sulfonic acid radicals, in which at least one alcoholiform hydroxyl has been replaced by a polybasic carboxy acid body residue, and in which at least one alcoholiform hydroxyl has been replaced by a hydrocarbon derivative residue.

12. A process for breaking a petroleum emulsion of the water-in-oil type, which consists in subjecting the emulsion to the action of a demulsifying agent comprising a water-immiscible substituted polyhydric alcohol body, free from sulfonic acid radicals, in which at least one alcoholiform hydroxyl has been replaced by a polybasic carboxy acid body residue, and said polybasic carboxy acid body residue is characterized by the fact that at least one of its remaining acid hydrogens has been replaced by a hydrocarbon derivative residue.

13. A process for breaking a petroleum emulsion of the water-in-oil type, which consists in subjecting the emulsion to the action of a demulsifying agent comprising a substituted polyhydric alcohol body in which at least one alcoholiform hydroxyl has been replaced by a polybasic carboxy acid body residue, and said polybasic carboxy acid residue is characterized by the fact that at least one of its remaining acid hydrogens has been replaced by a hydrocarbon derivative residue derived from a hydrocarbon body in the form of an ester free from an acid hydrogen.

14. A process for breaking a petroleum emulsion of the water-in-oil type, which consists in subjecting the emulsion to the action of a demulsifying agent comprising a substituted polyhydric alcohol body in which at least one alcoholiform hydroxyl has been replaced by a polybasic carboxy acid body residue, and said polybasic carboxy acid residue is characterized by the fact that at least one of its remaining acid hydrogens has been replaced by a hydrocarbon derivative residue derived from a hydrocarbon body in the form of a glyceride free from an acid hydrogen.

15. A process for breaking petroleum emulsions of the water-in-oil type, which consists in subjecting the emulsion to the action of a demulsifying agent comprising a substituted polyhydric alcohol in which at least one alcholiform hydroxyl has been replaced by a polybasic carboxy acid residue, and said polybasic carboxy acid residue is characterized by the fact that at least one of its remaining acid hydrogens has been replaced by a hydrocarbon derivative residue derived from a hydrocarbon body in the form of an ester free from an acid hydrogen.

16. A process for breaking petroleum emulsions of the water-in-oil type, which consists in subjecting the emulsion to the action of a demulsifying agent comprising a substituted polyhydric alcohol in which at least one alcoholiform hydroxyl has been replaced by a polybasic carboxy acid residue, and said polybasic carboxy acid residue is characterized by the fact that at least one of its remaining acid hydrogens has been replaced by a hydrocarbon derivative residue derived from a hydrocarbon body in the form of a glyceride free from an acid hydrogen.

17. A process for breaking a petroleum emulsion of the water-in-oil type, which consists in subjecting the emulsion to the action of a demulsifying agent comprising a substituted polyhydric aliphatic alcohol, in which at least one alcoholiform hydroxyl has been replaced by a polybasic carboxy acid residue, and said polybasic carboxy acid residue is characterized by the fact that at least one of its remaining acid hydrogens has been replaced by a hydrocarbon derivative residue derived from a hydrocarbon body in the form of an ester free from an acid hydrogen.

18. A process for breaking a petroleum emulsion of the water-in-oil type, which consists in subjecting the emulsion to the action of a demulsifying agent comprising a substituted polyhydric aliphatic alcohol, in which at least one alcoholiform hydroxyl has been replaced by a polybasic carboxy acid residue, and said polybasic carboxy acid residue is characterized by the fact that at least one of its remaining acid hydrogens has been replaced by a hydrocarbon derivative residue derived from a hydrocarbon body in the form of a glyceride free from an acid hydrogen.

19. A process for breaking a petroleum emulsion of the water-in-oil type, which consists in subjecting the emulsion to the action of a demulsifying agent comprising a substituted polyhydric alcohol, in which at least one alcoholiform hydroxyl has been replaced by a polybasic aromatic carboxy acid residue, and said polybasic aromatic carboxy acid residue is characterized by the fact that at least one of its remaining acid hydrogens has been replaced by a hydrocarbon derivative residue derived from a hydrocarbon body in the form of an ester free from an acid hydrogen.

20. A process for breaking a petroleum emulsion of the water-in-oil type, which consists in subjecting the emulsion to the action of a demulsifying agent comprising a substituted polyhydric alcohol, in which at least one alcoholiform hydroxyl has been replaced by a polybasic aromatic carboxy acid residue, and said polybasic aromatic carboxy acid residue is characterized by the fact that at least one of its remaining acid hydrogens has been replaced by a hydrocarbon derivative residue derived from a hydrocarbon body in the form of a glyceride free from an acid hydrogen.

CLAUDIUS H. M. ROBERTS.

CERTIFICATE OF CORRECTION.

Patent No. 2,000,717.  May 7, 1935.

CLAUDIUS H. M. ROBERTS.

It is hereby certified that error appears in the printed specification of the above numbered patent requiring correction as follows: Page 4, first column, line 34, claim 1, and line 46, claim 2, first occurrence, for "hydrogen" read hydrocarbon; and lines 57 and 69, claims 3 and 4, for "hydrogen" read hydrocarbon; and that the said Letters Patent should be read with these corrections therein that the same may conform to the record of the case in the Patent Office.

Signed and sealed this 27th day of August, A. D. 1935.

Leslie Frazer (Seal)  Acting Commissioner of Patents.

CERTIFICATE OF CORRECTION.

Patent No. 2,000,717.                                May 7, 1935.

CLAUDIUS H. M. ROBERTS.

It is hereby certified that error appears in the printed specification of the above numbered patent requiring correction as follows: Page 4, first column, line 34, claim 1, and line 46, claim 2, first occurrence, for "hydrogen" read hydrocarbon; and lines 57 and 69, claims 3 and 4, for "hydrogen" read hydrocarbon; and that the said Letters Patent should be read with these corrections therein that the same may conform to the record of the case in the Patent Office.

Signed and sealed this 27th day of August, A. D. 1935.

Leslie Frazer (Seal)                                Acting Commissioner of Patents.